Aug. 11, 1942.  R. F. THORNTON  2,292,910
MULTIPLE GEAR SHIFT MECHANISM
Filed July 9, 1941  3 Sheets-Sheet 1

INVENTOR
Ray F. Thornton
BY
Everett J. Wright
ATTORNEY

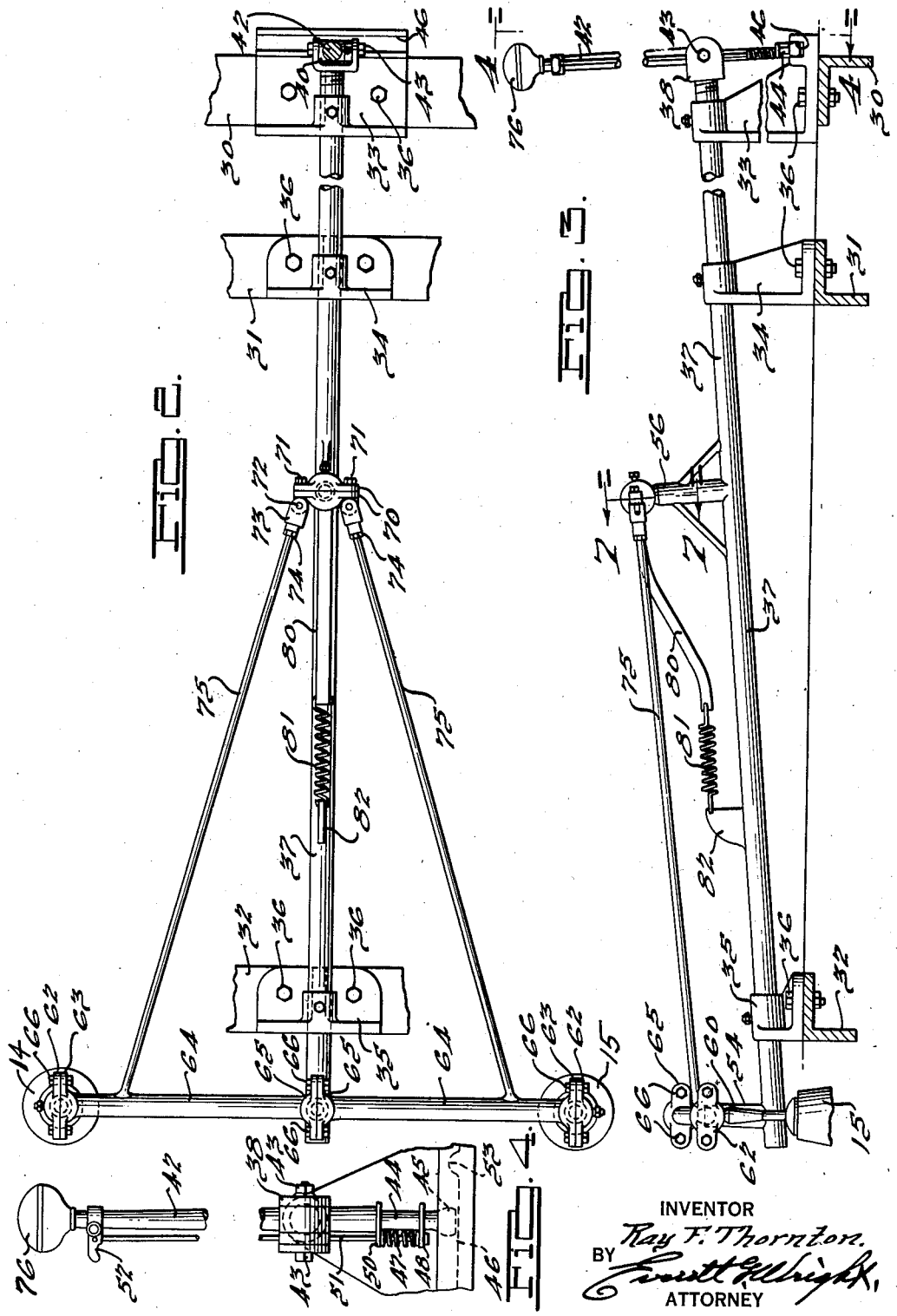

Aug. 11, 1942.   R. F. THORNTON   2,292,910
MULTIPLE GEAR SHIFT MECHANISM
Filed July 9, 1941   3 Sheets-Sheet 3
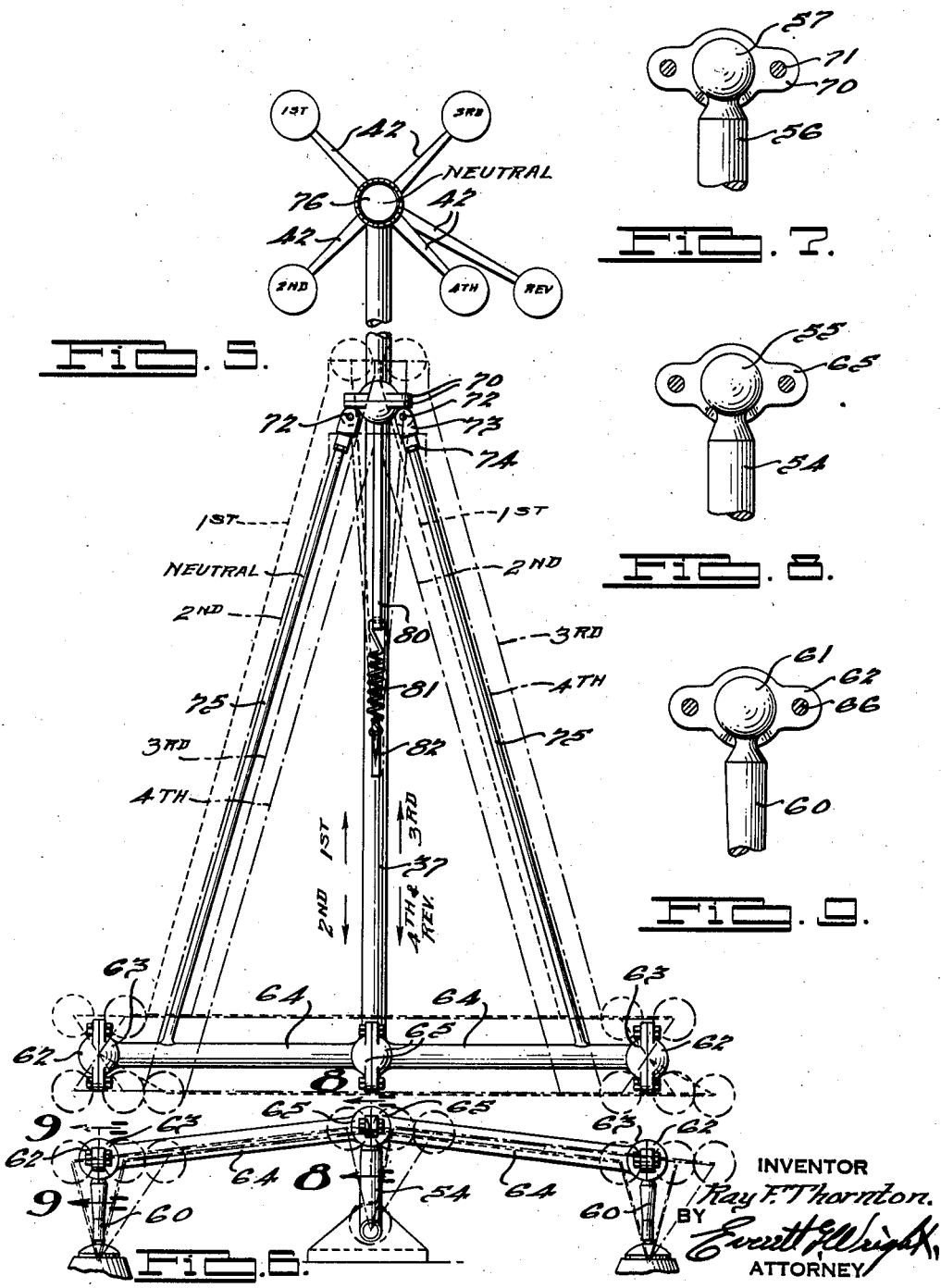
INVENTOR
Ray F. Thornton.
BY
ATTORNEY Patented Aug. 11, 1942

2,292,910

UNITED STATES PATENT OFFICE 2,292,910

MULTIPLE GEARSHIFT MECHANISM

Ray F. Thornton, Dearborn, Mich.

Application July 9, 1941, Serial No. 401,638

7 Claims. (Cl. 74—473)

This invention relates to vehicle transmission control mechanism and more especially to mechanism for exercising the control of transmissions of multiple motored vehicles.

An object of the invention is to improve the art of multiple motored vehicles.

Another object of the invention is to provide a system for controlling a plurality of transmission mechanisms which will be reliable and efficient in operation and which will extend the advantages of multiple motored power plants to heavy load carrying vehicles.

A further object of the invention is to provide control mechanism and connections which will facilitate the engagement and disengagement and change speed operations of a plurality of transmission mechanisms of a multiple motored vehicle.

For the purpose of illustrating the genus of the invention, a typical embodiment thereof is depicted in the accompanying drawings, in which:

Fig. 2 is an enlarged top plan view of the control mechanism shown in Fig. 1.

Fig. 3 is a side elevational view of the control mechanism shown in Figs. 1 and 2.

Fig. 4 is a vertical elevational view taken on the line 4—4 of Fig. 3.

Fig. 5 is a top plan view similar to Fig. 2 but depicting the parts in the various operating positions.

Fig. 6 is a vertical elevational view of the construction shown in Fig. 5, the view being taken from the bottom of Fig. 5.

Fig. 7 is a vertical sectional view taken substantially on the line 7—7 of Fig. 3.

Figure 1:
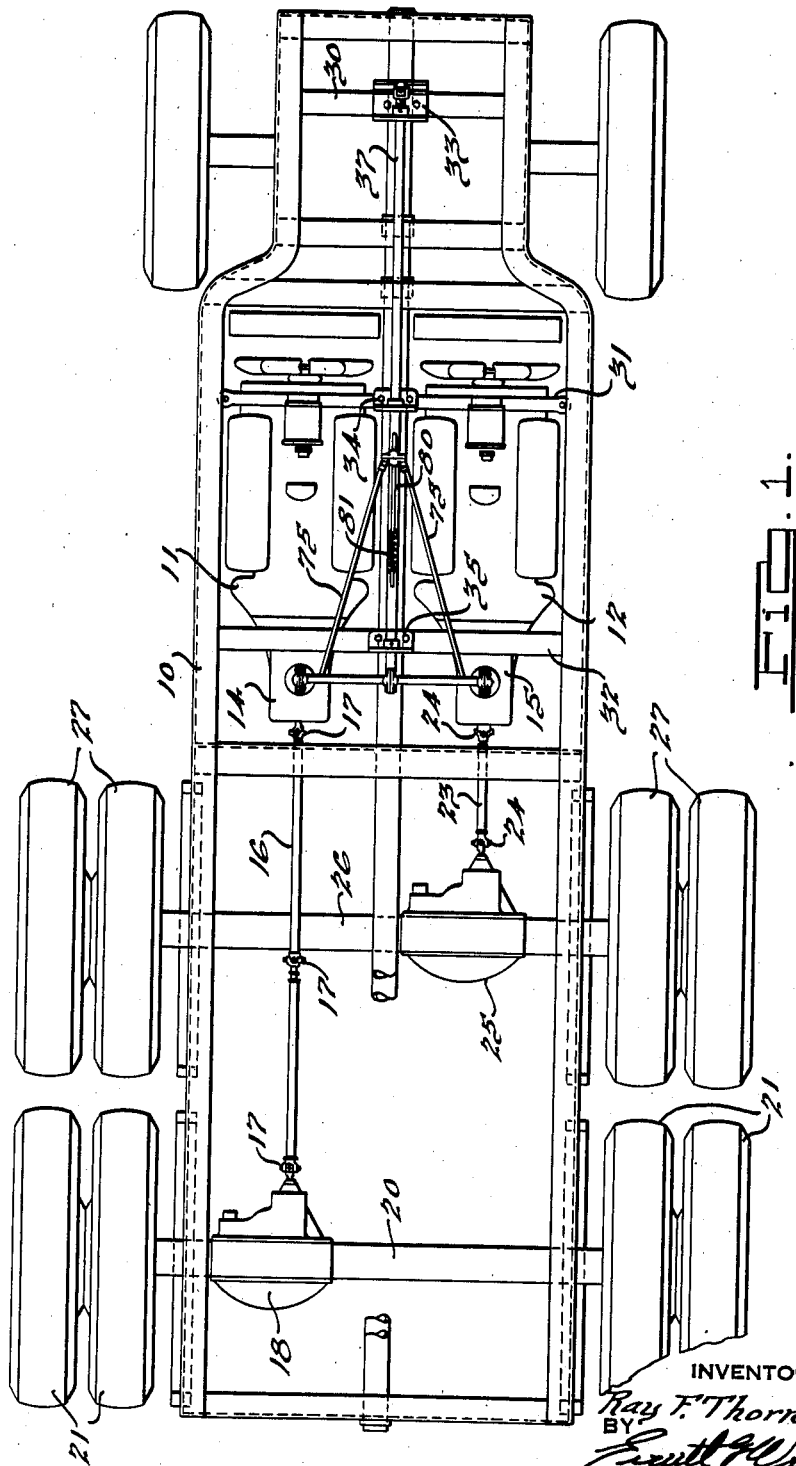
Fig. 1 is a top plan view of a tractor unit provided with dual motors and a transmission control mechanism constructed in accordance with the present invention and associated with the transmission mechanism for such motors.

Figs. 8 and 9 are similar vertical sectional views taken on the lines 8—8 and 9—9 of Fig. 6.

Referring to Fig. 1, the chassis frame 10 of a tractor unit has mounted at an intermediate portion thereof a pair of motors 11 and 12 provided with substantially integral change speed transmissions 14 and 15, respectively. A propeller shaft 16 provided with suitable universal joints 17 leads from the transmission unit 14 to a differential 18 carried by axle 20 associated with a pair of dual drive wheels 21. The propeller shaft 23 provided with suitable universal joints 24 connects the transmission 15 with a differential 25 carried by axle 26 associated with a pair of dual drive wheels 27.

Referring to Figs. 1 to 4 inclusive, it is noted that the cross members 30, 21 and 32 of the chassis frame 10 of the tractor carry bearing elements 33, 34 and 35 bolted to cross members as indicated by the numeral 36. The shaft 37 is mounted for rotation and reciprocation in the said bearings 33, 34 and 35. The right hand end of the rod 37 as viewed in Figs. 1, 2 and 3, has threaded thereto a clevis 38 adapted to be pivotally connected to a block 40 secured to or in the form of an enlargement on a manual gear shift lever 42 by means of a bolt 43. Telescoping loosely within the lower end of the gear shift lever 42 is detent rod 44 terminating in a rounded head 45 adapted to travel at all times in a channel 46 provided in the forward or right hand end of the bearing element 33 as viewed in Figs. 2 and 3. The spring 47 normally urges the rod 44 downwardly to maintain its rounded head 45 within the channel 46. To accomplish the foregoing, the spring 47 is arranged in compressed condition between a collar piece 48 fixed to the rod 44 and a similar collar piece 50 fixed to the lower end of the manual gear shift lever 42. A rod 51 is fixed to the collar 48 and passes upwardly through the center of the spring 47 through the collar 50 and is pivotally connected to a finger piece 52 which in turn is pivoted to the gear shift lever for elevating the rounded head 45 of detent rod 44 within the channel 46. This permits the head 45 to be lifted over a boss 53 and maintained in back of said boss to hold the manual gear shift lever 42 in a reverse position as will be explained later. While the rod 37 might be solid, it is preferably tubular in form for lightness and rigidity, and adjacent its rear or left hand end as viewed in Figs. 2 and 3, an upright tubular element 54 is provided which terminates at its upper end in a ball 55. A similar tubular upright 56 extends upwardly from the tubular element 37 at a point intermediate bearings 34 and 35 and terminates at its upper end in a ball 57.

Each of the transmissions 14 and 15 is provided with a gear shift lever 60 which terminates at its upper end in a ball 61, as indicated in Figs. 1, 3, 6 and 9. Sockets for the balls 61 of the transmission gear shift levers 60 are each made up of nearly semi-spherical bearing halves 62 and 63, the bearing halves 63 each being made integral with a tubular piece 64 which extends to a bearing half 65 integral with tubular piece 64, and each of these bearing pieces are bolted together in pairs by means of bolts 66. The tubular upright 56 which is made substantially integral with the tubular shaft 37 is reinforced in its position relative to the tubular shaft 37 by means of a pair of brace rods 67, and the ball 57 at the upper end of tubular piece 56 is adapted to be enclosed by bearing halves 70 and these are maintained in assembled relation by such means as a pair of eye bolts 71. The eye bolts 71 are pivotally connected by means of pins 72 to a pair of clevices 73 threaded to rods 75 and adapted to be locked in adjusted positions relative to the rods 75 by means of lock nuts 74. The rods 75 are welded or otherwise integrally secured to the tubular element 64 at points adjacent the swivel connections between the rod 64 and the gear shift levers 60 for the transmissions 14 and 15.

Reference now may be had to Figs. 5 and 6 which indicate the movement of the gear shift lever 42 to the positions designated by the legends 1st, 2nd, 3rd, 4th and Rev. and the corresponding movements on a smaller scale of the ball and socket 55—65 and the approximate corresponding movement of the ball 61 at the upper end of the transmission gear shift levers 60. In its forward and rearward movement, lever 42 pivots about its lower end 45 which is confined by the channel 46 and pivots for its rotational movement about the axis of the tubular shaft 37 and clevis 38 with the lower end 45 sliding in the channel 46. The forward and rearward movements of the lever 42 causes reciprocation of the tubular shaft 37 along its own axis. Lateral movements of the hand lever 42 cause rotational movements of the tubular shaft 37 about its own axis to cause the ball 55 to follow, at a reduced scale, the movement of the knob piece 76 at the upper end of the hand lever 42. The ball 57 at the upper end of the tubular upright 56 follows the motion of the ball 55 at the upper end of the tubular upright 54 since both are rigidly fixed relative to the tubular rod 37. The bolts 66 clamp the socket halves 65 in rigid relationship with respect to each other so that the tubular rod pieces 64 form virtually a single cross bar connecting the ball 55 with the balls 61 at the upper ends of the short transmission gear shift levers 60.

The transmissions 14 and 15 are the usual gear boxes employed in automotive vehicle construction and, since there is no assurance that the motors 11 and 12 would be operating in synchronism or that either pair of wheels 21 and 27 would be in synchronism either with the other wheels or with either motor 11 or 12, the gears of transmission 14 or 15 would not necessarily mesh or disengage at the same time that the corresponding gears of the other transmission would engage or disengage. Since the gears of one gear box would have a tendency under ordinary circumstances to mesh before the correponding gears of the other gear box it is essential that the tubular rod 64, as a single unit, have a whiffletree-like action about the ball 55 as a center so that the gears of one transmission can mesh or disengage ahead of the gears of the other transmission. If, for example, with both motors 11 and 12 running, it is attempted to place both transmissions in first gear then the gear shift lever 42 would be moved to the position indicated by the legend 1st, which as viewed in Fig. 5 would move the rod 37 upwardly and rotate ball 55 and socket 65 to the left causing movement both upwardly and to the left of both the socket 62—63 and the ball 61 at the upper end of the transmission gear shift lever 60.

If the gears of the transmission 14 meshed first, the tubular rod element 64 would tend to swing in the direction of gear mesh, either forward or back as the case may be, about the ball 55 and relative to the rod 37, and maintain such position until the gears of transmission 15 come into engagement. If this swinging of the tubular elements 64 as a unitary cross bar were unrestrained, it is noted that when the gears of transmission 14 first come into mesh there would be a tendency for certain gears of the transmission 15 to clash; the gears of the second speed being the most likely to clash under these circumstances. The only restraining influence tending to maintain the parts shown in Fig. 5 in the position indicated in full lines would be the rigidity of the stay rods 75 relative to the tubular element 64 as a single cross bar, but this would be slight since the rods 75 are long and slender so that they may flex readily. As the cross bar 64 swings, the left hand pivotal connection 72, as viewed in Fig. 5, moves away from a straight line drawn between the point of attachment of the left stay rod 75 to element 64 and the center of ball and socket joint 57—70, while the right hand pivot pin 72 moves toward a line connecting the center of ball 57 with the point of attachment of the right hand rod 55 with the tubular element 64. This in effect shortens the left hand rod 75 while lengthening the right hand rod 75.

To obviate the clashing of gears and insure that the proper gears only are brought in mesh, means are provided for maintaining or urging the sockets 70 as a unit to maintain their position with respect to the rod 37. This is effected by providing a lever 80 integral with one of the socket halves 70, the lower socket half 70 in the embodiment depicted in Fig. 5, which lever 80 normally extends parallel with the rod 37 and is yieldably maintained in such a position by means of a spring 81 tensioned between the lower end of lever 80 and an anchor plate 82 fixed to the rod 37. The spring 81 under tension tends to keep the lever 80 parallel to the shaft 37 and to maintain the stay rods 75, the socket 70 and the cross bar 64 in the positions indicated in Fig. 5 in full lines, so that extensive swinging of the cross member 64 about the ball 55 will not occur and cause undesired clashing of gears of either gear box 14 or 15 and so that gears will be smoothly engaged and disengaged in any sequence and otherwise cause the transmission gear shift levers to follow closely the movements of the hand gear shift lever 42.

As many changes could be made in the above described constructions and many apparently widely different embodiments of this invention could be had without departing from the spirit and scope thereof, it is intended that all matter contained in the above description or shown in the accompanying drawings shall be interpreted as illustrative and not in a limited sense.

What is claimed is:

1. For use in vehicles having a plurality of motors and a change speed transmission for each motor, a control comprising a manual master lever disposed in said vehicle at a point remote from said transmissions, a gear shift lever individual to each transmission extending therefrom, a movable element arranged between said transmissions, means operable in response to movements of said master manual lever for causing corresponding movements of the said movable element, a bar element pivotally connected to said gear shift levers and to said movable element, and means yieldably urging said bar element so that it tends to cause simultaneous movements of the gear shift levers in correspondence with movements of the master manual lever but allowing the movements of the gear shift levers to occur in different sequences.

2. For use in vehicles having a plurality of motors and a change speed transmission for each motor, a control comprising a manual lever disposed in said vehicle at a point remote from said transmissions, a gear shift lever individual to each transmission, a rod slidably and rotatably mounted in said vehicle and connected to said manual lever, an upright element fixed to said rod so that its outer end moves in response to and in correspondence with movements of said manual lever, a cross bar pivotally connected to the outer end of said upright element and pivotally connected to said gear shift lever, and means for yieldably urging said cross bar to a position normal to said rod whereby said gear shift levers normally operate in response to and in correspondence with movements of said manual lever and said last named means causes such movements of the gear shift levers to occur in different sequences.

3. For use in vehicles having a plurality of motors and a change speed transmission for each motor, a control comprising a manual lever disposed in said vehicle at a point remote from said transmissions, a gear shift lever individual to each transmission, a rod slidably and rotatably mounted in said vehicle and connected to said manual lever, a pair of spaced uprights each fixed to each rod so that the outer ends of said uprights move in response to and in correspondence with movements of said manual lever, a cross bar pivotally connected to the outer end of one of said uprights and pivotally connected to said gear shift levers, means pivotally connected to the outer end of said second upright, spring means connected to last-named means and to said rod, and stay rods connected to said last-named means and to said cross bar for yieldably maintaining said cross bar normal to said rod, whereby movements of said manual lever cause corresponding movements of said gear shift levers but said spring means yields to allow such movements of the different gear shift levers to occur in different sequences.

4. For use in vehicles having a plurality of motors and a change speed transmission for each motor, a control comprising a manual lever disposed in said vehicle at a point remote from said transmissions, a gear shift lever individual to each transmission, a rod slidably and rotatably mounted in said vehicle and connected to said manual lever, a pair of upright elements spaced from each other and fixed to said rod so that the outer ends of said uprights move in response to and in correspondence with movements of said manual lever, a cross bar pivotally connected to the outer end of one of said uprights and pivotally connected to said gear shift levers, means pivotally connected to the outer end of the second of said uprights, spring means connected to said last-named means, a pair of adjustable stay rods pivotally connected to said last-named means and connected to said cross bar at points adjacent the pivotal connections of the cross bar to said gear shift levers for normally maintaining the cross bar in a position at right angles to said rod, whereby movements of said manual lever urge corresponding movements of said gear shift levers but such springs means yields to allow such movements of the different gear shift levers to occur in different sequences.

5. For use in vehicles having a plurality of motors and a change speed transmission individual to each motor and provided with an individual gear shift lever, a control comprising a manual lever disposed in said vehicle at a point remote from said transmissions and having its lower end confined to movement in a plane transverse to said vehicle, a rod pivotally connected to said manual lever rotatable about its own axis and slidable longitudinally of said vehicle, a pair of spaced uprights fixed to said rod so that movements of the upper ends of said uprights correspond with movements of a point on said manual lever, a cross bar pivotally connected to each of said gear shift levers and to one of said uprights, a bearing means pivoted to the other upright, guide means pivotally connected to said bearing means and fixed to said cross bar, and resilient means for urging said bearing to a predetermined position relative to said rod to yieldably maintain said cross bar in a position transverse to said slidable rod to cause movements of said gear shift levers to correspond with movements of said manual lever but to allow movements of said gear shift levers to take place in different sequences.

6. For use in vehicles having a plurality of motors and a change speed transmission individual to each motor and provided with an individual gear shift lever, a control comprising a manual lever disposed in said vehicle at a point remote from said transmissions and having its lower end confined to movement in a plane transverse to said vehicle, a rod pivotally connected to said manual lever rotatable about its own axis and slidable longitudinally of said vehicle, a pair of spaced uprights fixed to said rod so that movements of the upper ends of said uprights correspond with movements of a point on said manual lever, a cross bar pivotally connected to each of said gear shift levers and to one of said uprights, a bearing means pivoted to the other upright, a pair of stay rods each pivotally connected to said bearing means at one end and fixed at the other end to said cross bar at a point adjacent a gear shift lever, and spring means for urging said bearing means to such a position as to maintain said cross bar transverse to said slidable rod to cause movements of said gear shift levers to correspond with movements of said manual lever but to allow movements of said gear shift levers to take place in different sequences.

7. For use in vehicles having a plurality of motors and a change speed transmission individual to each motor and provided with an individual gear shift lever, a control comprising a manual lever disposed in said vehicle at a point remote from said transmissions and having its lower end confined to movement in a plane transverse to said vehicle, a rod pivotally connected to said manual lever rotatable about its own axis and slidable longitudinally of said vehicle, a pair of spaced uprights fixed to said rod so that movements of the upper ends of said uprights correspond with movements of a point on said manual lever, a cross bar pivotally connected to each of said gear shift levers and to one of said uprights, a bearing means pivoted to the other upright, a pair of guide rods each pivotally connected at one end to said bearing means and fixed at the other end of said cross bar adjacent a gear shift lever, means in each guide rod for adjusting its length, a lever fixed to said bearing, spring means secured under tension to said last-named lever and to said slidable rod for urging the cross bar to a position transverse to the slidable rod to cause movements of said gear shift levers to correspond with movements of said manual lever and allow the gear shift levers to move in different sequences with respect to each other.

RAY F. THORNTON.